United States Patent
Atzaba

[11] Patent Number: 5,931,678
[45] Date of Patent: Aug. 3, 1999

[54] APPARATUS FOR DEMONSTRATION OF EARTH'S ROTATION ABOUT THE SUN

[76] Inventor: Avinoam Atzaba, 18/52 Hagomeh Street, Gilo, Jerusalem, Israel

[21] Appl. No.: 09/041,299

[22] Filed: Mar. 12, 1998

[51] Int. Cl.$^6$ ................................................ G09B 23/00
[52] U.S. Cl. ............................................ 434/291; 434/284
[58] Field of Search .................................. 434/284, 285, 434/287, 288, 291

[56] References Cited

U.S. PATENT DOCUMENTS

| | | | |
|---|---|---|---|
| 6,656 | 8/1849 | Swain | 434/291 |
| 321,000 | 6/1885 | Berneike | 434/284 |
| 958,139 | 5/1910 | Laing | 434/291 |
| 1,148,891 | 8/1915 | McKendree | 434/284 |
| 1,290,664 | 1/1919 | Russell et al. | 434/291 |
| 1,802,859 | 4/1931 | Wise | 434/285 |
| 1,952,024 | 3/1934 | Russert | 434/284 |
| 2,114,082 | 4/1938 | Mast | 434/291 |
| 3,089,259 | 5/1963 | Miller | 434/291 |
| 3,835,554 | 9/1974 | Mast | 434/288 |
| 3,879,862 | 4/1975 | Chin | 434/291 |

FOREIGN PATENT DOCUMENTS 570089  1/1933  Germany ............................... 434/291

*Primary Examiner*—Kien T. Nguyen
*Assistant Examiner*—Michael B. Priddy
*Attorney, Agent, or Firm*—Dowell & Dowell, P.C.

[57] ABSTRACT

An apparatus for demonstrating various phenomena associated with the earth's movement about the sun, having an upright fixedly attached to a base, at least one arm having two ends and being mounted on the upright in such a way as to be rotatable in a vertical plane, a crooked bearing housing for a spindle located near one of the ends, carrying a rotatable globe and constituting the axis of rotation thereof, all in such a way that, with respect to a line normal to the plane defined by the arc, the axis of rotation of the globe is imparted a downward inclination of about 23.5°. The apparatus further includes a light source unit attached to the arm at a point near the other end thereof and producing a light beam of a spatial extent sufficient to fully cover the globe, and drive means for causing the globe to rotate about its own axis, and for causing the arm to rotate in the vertical plane.

8 Claims, 4 Drawing Sheets

APPARATUS FOR DEMONSTRATION OF EARTH'S ROTATION ABOUT THE SUN

BACKGROUND OF THE INVENTION

1. Field of the Invention

The present invention relates to an apparatus to be used for demonstration of various phenomena associated with the movement of the earth about the sun and about its own axis, such as day and night, the changes in their relative length, the seasons, the equinoxes and solstices, and the constancy of the orientation of the earth's axis of rotation relative to a fixed point in space.

2. Brief Description of the Related Art

Such apparatuses are known and available under the name of "Tellurion," and can indeed be used to demonstrate the above phenomena. These table-top devices, operable either manually by means of a crank, or electrically, consist of a heavy stand, a horizontal arm mounted on, and rotatable about, this stand, a light source representing the sun, mounted on, and rotating with, this arm and a rotatable globe with its axis at an angle with the vertical of about 23.5°, mounted on a small pedal which is itself rotatably mounted on the free end of the arm. While it is relatively simple to convert the cranking of a handle or the output of an electric gear motor into a revolving movement of the arm, causing the globe to "orbit" the "sun" and, by means of another set of gears, make the globe rotate about its axis during this orbital movement, a serious complication of the entire system is due to the fact that, in order to preserve the above-mentioned constancy of orientation of the globe's axis, the pedestal has to be imparted a compensatory movement equal in speed, but opposite in sense, to the movement of the arm. This requires the provision of a sophisticated, epicyclic, multicomponent gear system that is very expensive, especially if produced to industrial standards to ensure trouble-free operation and a reasonably long service life even, and especially, under conditions of rough treatment and lack of proper maintenance, as is to be expected, e.g. in schools.

SUMMARY OF THE INVENTION

It is thus one of the objects of the present invention to overcome the drawbacks of existing tellurions and to provide a tellurion that, while capable of demonstrating all of the above phenomena, is of a simple and robust design using standard gearing, therefore being significantly less expensive and more tolerant of rough handling.

According to the invention, this is achieved by providing an apparatus for demonstrating various phenomena associated with the earth's movement about the sun, comprising an upright fixedly attached to a base; at least one arm having two ends and being mounted on said upright in such a way as to be rotatable in a vertical plane; a crooked bearing housing for a spindle located near one of said ends, carrying a rotatable globe and constituting the axis of rotation thereof, all in such a way that, with respect to a line normal to the plane defined by said at least one arm, said axis of rotation of said globe is imparted a downward inclination of about 23.5°; a light source unit attached to said at least one arm at a point near the other end thereof and producing a light beam of a spatial extent sufficient to fully cover said globe; drive means for causing said globe to rotate about its own axis, and for causing said at least one arm to rotate in said vertical plane, wherein said crooked bearing housing imparting said inclination to the axis of rotation of said globe, is itself rotatably mounted in a low-friction bearing seated in a housing fixedly attached to said at least one arm whereby the force of gravity will cause said crooked bearing housing and thus said axis of rotation of said globe to be always located in a vertical plane, pointing downwards, irrespective of the instantaneous rotational position of said at least one arm and, thus, the orbital position of said globe, and wherein said light source unit comprises means for having an imaginary axis of said light beam substantially pass through the center of said globe, irrespective of the instantaneous orbital position thereof.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a side view of the apparatus according to the invention;

FIG. 2 is a front view of the apparatus;

FIG. 3 illustrates the gear motor that powers all moving parts, the main shaft assembly, the globe spindle mount and the display disc;

FIG. 4 is a front view of the base plate;

FIG. 5 shows the worm wheel of FIGS. 3 and 4;

FIG. 6 is a cross-sectional view of the bearing bushing for the worm wheel of FIG. 5;

FIG. 7 represents the main bearing housing, the fast-motion motor and the slip ring contacts;

FIG. 8 represents a top view of the light source;

FIG. 9 is a front view of the light source as seen in the direction of arrow X;

FIG. 10 is a schematic representation of a rigidly mounted light source unit in the equinoctial position of the system;

FIG. 11 shows a rigidly mounted light source unit in the solstitial position of the system;

Figure 13:
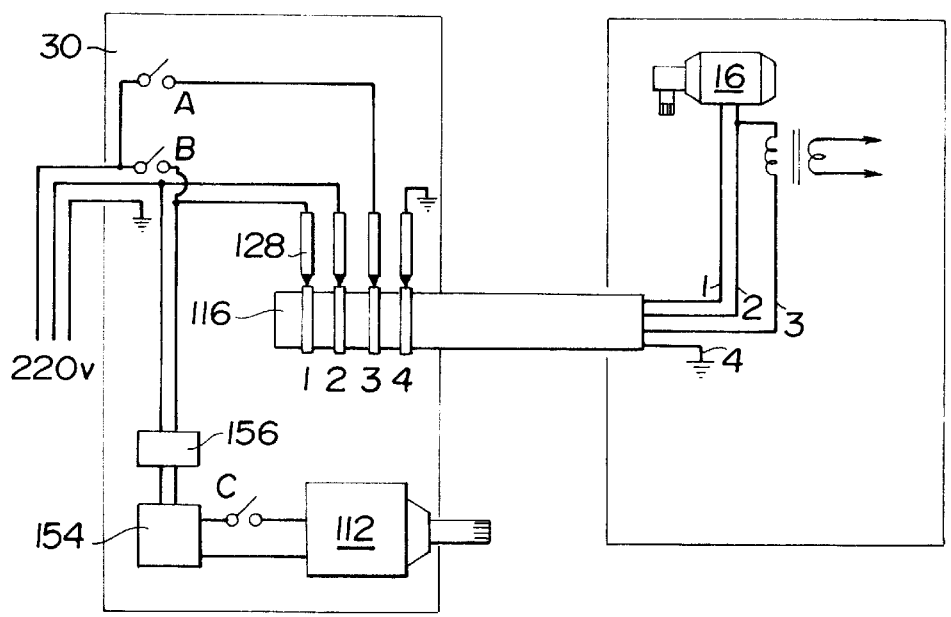
Figure 12:
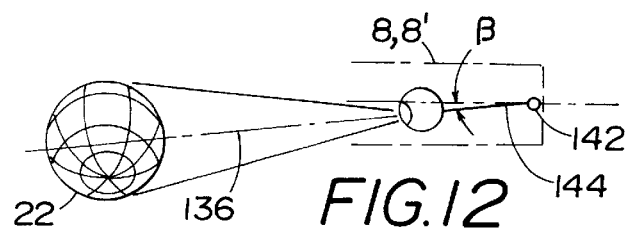

FIG. 12 shows the articulatedly mounted light source unit according to the invention in the identical solstitial position, and FIG. 13 represents the electrical layout of the apparatus according to the invention.

DESCRIPTION OF THE PREFERRED EMBODIMENT

Figure 1:
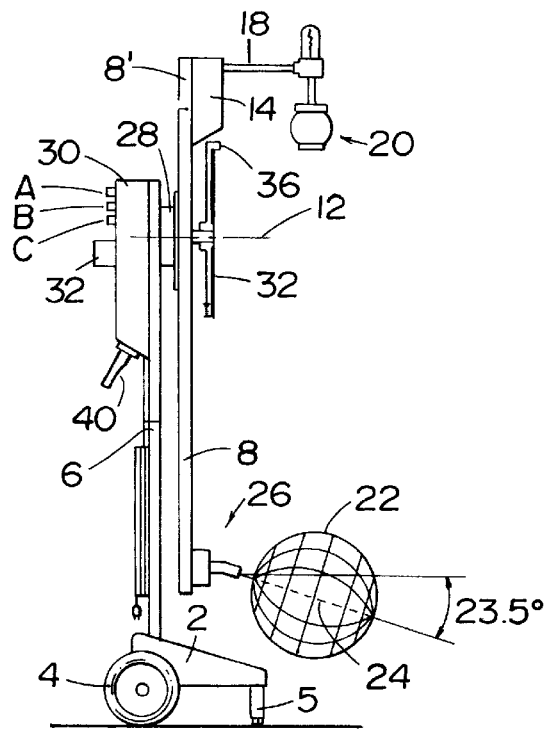
Figure 2:
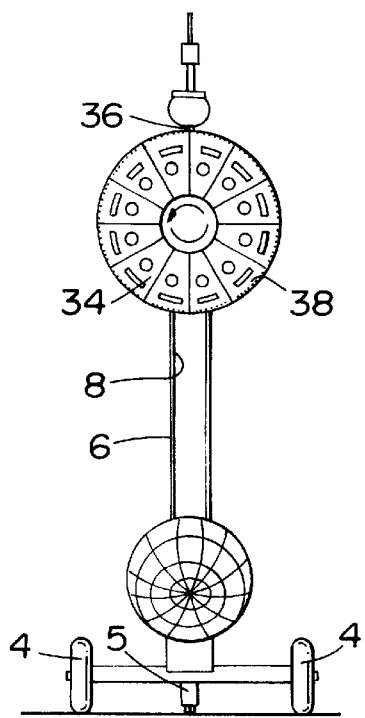

Referring now to the drawings, there is seen in FIGS. 1 and 2 a base 2 provided with two wheels 4 and a front leg 5. Wheels 4 are widely spaced to constitute, together with front leg 5, a triangular base large enough to ensure stability.

Fixedly attached to base 2 is an upright 6, advantageously made of a tubular aluminum extrusion of rectangular cross-section. Via components to be discussed further below, upright 6 carries the entire apparatus.

Further seen is a two-part arm with a first portion 8 and a second portion 8', both made of a tubular aluminum extension slightly narrower than that of upright 6 and both fixedly attached to a common base plate 10. The two portions meet at the height of axis 12 about which, as will be explained in detail further below, arm 8, 8' rotates when the apparatus is operated.

Figure 3:
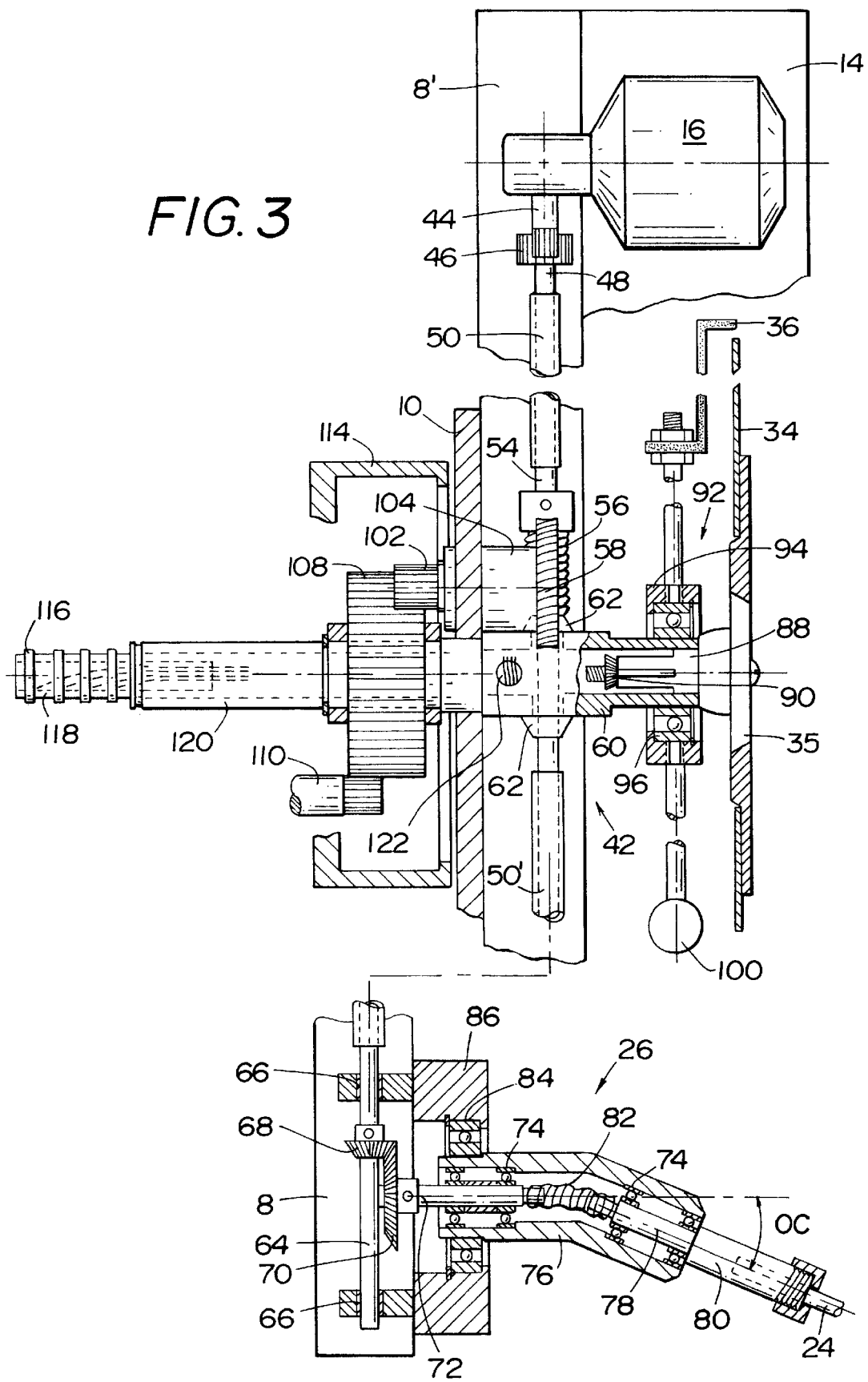

To arm portion 8' is attached a housing 14 which accommodates an electric gear motor 16 shown in FIG. 3 and a tubular arm 18 hat supports a light source unit 20 which represents the sun.

At its free end, arm portion 8 carries a globe 22 which, obviously, represents the earth and is fixedly mounted on a spindle 24. It is seen that spindle 24 includes an angle (23.5°) with a normal to the plane of arms 8, 8' which is approximately the angle included by the earth's axis with a line normal to the plane of the ecliptic. Seen also is the spindle mount unit 26, which not only determines the above angle of inclination, but also transmits the rotary movement to globe spindle 24 and, in a manner to be explained further below, maintains the above-mentioned constancy of spatial orientation of the axis of rotation of globe 22.

Close to the upper end of upright 6 there is seen the main shaft bearing housing 28 and a housing 30 accommodating the electrical controls A, B, C and a rapid-movement motor 32 which, as will be explained below in detail, acts only on the rotary movement of arms 8, 8', but not on the rotation of globe 22.

Further seen in FIGS. 1 and 2 is a display disc 34 rotating together with arms 8, 8' and a stationary pointer 36. Disc 32 is divided into twelve sections, each representing a month, the disc periphery being provided with a scale 38, each division of which represents one day, with special markings for the equinoxes and the solstices. Each sector also contains a graphical approximation of the surface parts of the earth that receive sunlight during the days of that particular month.

For moving, the apparatus is slightly tilted back, using handle 40, to lift front leg 5 off the floor, after which the apparatus is easily moved on its two wheels 4.

FIG. 3 illustrates some of the main systems of the apparatus: the gear motor 16 that powers all moving parts; the main shaft assembly 42; the spindle mount unit 26 and the display disc 34 and its accessories.

Figure 4:
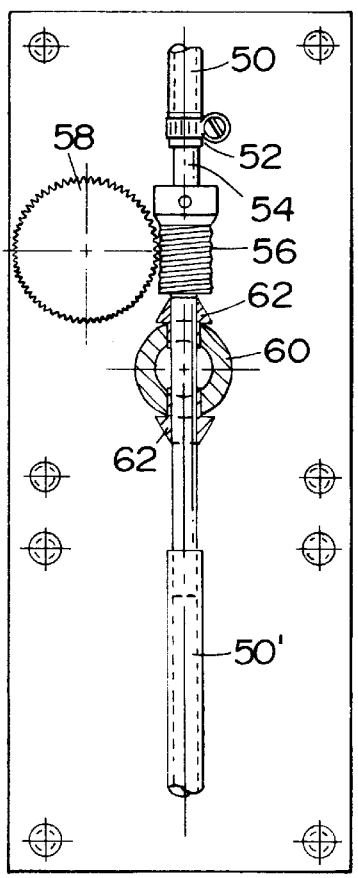

Gear motor 16 is mounted in housing 14. It works on the power mains with its output pinion 44 driving a gear wheel 46. Shank 48 of gear 46 is introduced and fixedly connected (e.g., by means of a pipe clamp 52 such as shown in FIG. 4) to a first length of metal tubing 50 which extends along arm 8' for almost the entire length of that arm, at which point it is fixedly connected (again, e.g., by pipe clamp 52) to a relatively short shaft 54. To shaft 54 is keyed a worm 56 which engages a worm wheel 58, the purpose of which will be explained further below, Shaft 54 passes through main shaft 60 via two guide bushings 62 and is fixedly connected to a second length of metal tubing 50' which exends to a point close to the free end of arm 8. The end of tubing 50' is fixedly connected to a shaft 64 which, between two bearing blocks 66, carries a bevel gear 68. The latter engages a second bevel gear 70 mounted on a first shaft 72 rotating in two ball bearings 74. Bearings 74 are mounted in a first half of a bearing housing 76. The second half of bearing housing 76, as can be seen, angularly deviates from the first half by an angle α=23.5° which, as was already explained above, is the angle included by the earth's axis with the normal to the plane of the ecliptic. The second half, too, carries two ball bearings 72 in which is rotatably seated the shank portion 78 of a chuck 80 that clamps onto globe spindle 24. Shaft 72 and shank 78 are elastically coupled by a helical spring 82. The flow of power from motor 16 to globe spindle 24 is thus clear: pinion 44→gear 46→tubing 50→shaft 54→tubing 50'→bevel gear 68→bevel gear 70→shaft 72→elastic coupling spring 82→chuck 80.

It is further seen that the crooked bearing housing 76 itself is mounted in a ball bearing 84 seated in a housing 86 fixedly attached to arm 8. The consequence of this design is obvious: because of the fact that, due to ball bearing 84, friction between bearing housing 76 and housing 86 is practically nil, the moment produced by the cantilevered bearing housing 76 even by its own weight, all the more so by the added weight of globe 22, will always cause bearing housing 76 and, thus, spindle 24, that is, the axis of rotation of globe 22, to be located in a vertical plane, pointing downwards, irrespective of the instantaneous rotational position of arms 8, 8'. Thus, by utilizing the force of gravity, the present invention has obviated the need for the earlier mentioned complex gearing to maintain the constancy of orientation of the globe's axis in space.

FIG. 3 furthermore shows display disc 34 as attached to hub 35. The latter is fixedly attached to hollow main shaft 60 by means of a slotted mandril 88 which can be expanded by means of a tapered nut 90. Steadiness of pointer unit 92, in spite of its being mounted on the rotating main shaft 60, is achieved by mounting the pointer body 94 on a ball bearing 96 and attaching to rod 98 a weight 100, thus again utilizing gravity to keep pointer 36 always in the same position.

While the above dealt mainly with the manner in which globe 22 is set rotating about its own axis, the following, in conjunction with FIGS. 3–7, explains the globe's rotation about the "sun," i.e., the rotation of arms 8, 8' and the mounting of the main shaft assembly 42.

Figure 5:
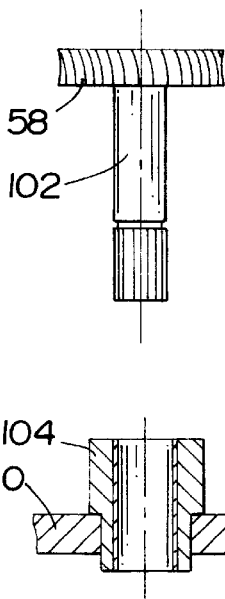
Figure 6:
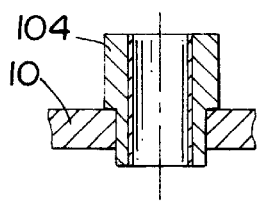

FIGS. 4, 5 and 6 illustrates the power take-off from the power flow: motor 16→bevel gear 68 as detailed in FIG. 3. Worm 56 and worm wheel 58 have already been mentioned. The latter is keyed to a gear pinion 102 mounted in a bearing bushing 104 which is firmly seated in base plate 10. Threaded holes 106 in base plate 10 serve for the attachment of arms 8, 8' to base plate 10.

Figure 7:
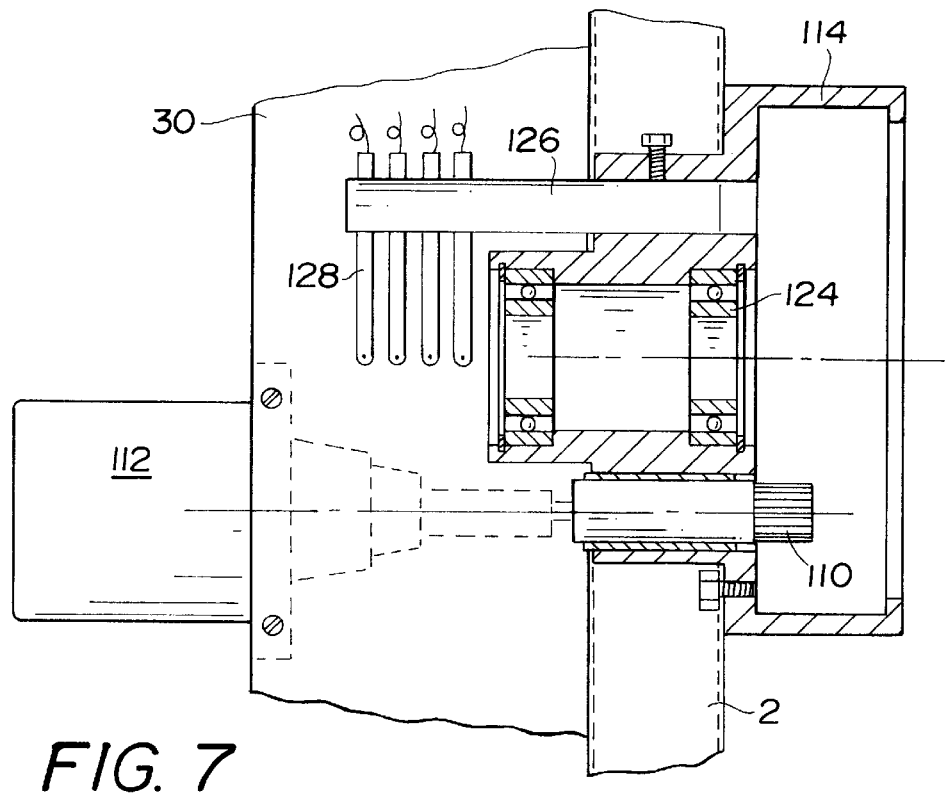

As seen in FIG. 3, pinion 102 projects beyond base plate 10 and meshes with gear 108 which freely rotates on, i.e., is not keyed to, main shaft 60. Gear 108, however, meshes with another gear pinion 110, which is connected to a second gear motor 112 (FIG. 7). Because of the reduction gearing integral with motor 112, a relatively large torque is required to rotate pinion 110 which therefore acts on gear 108 as a kind of brake. As a result, gear 108 becomes in fact stationary and the rotating pinion 102 therefore "rolls off" gear 108, carrying along base plate 10 and arms 8, 8'. Part of the main bearing housing 114, shown in full in FIG. 7, is also shown in FIG. 3.

Also seen in FIG. 3 are four slip rings 116 mounted on a tube 118 made of an electrically insulating material and pressed into the hollow main shaft 60. Wire leads 120 pass through the bore in main shaft 60 and emerge from a hole 122 drilled into shaft 60.

In FIG. 7, the main bearing housing 114 is seen to enter, and be attached to, upright 2, with part of housing 114 projecting beyond upright 2 into housing 30. Two ball bearings 124 support main shaft 60. Also shown is a bar 126, made of an insulating material, to which are attached contact springs 128 associated with slip rings 116, shown in FIG. 3.

While one full turn of globe 22 takes 24 seconds (which correspond to 24 hours taken by the earth in reality), the gear ratios selected (worm gear=1:75; gear 108: gear pinion 102=1.5) are such that one full turn of arms 8, 8' will take 24×365 seconds, which is approximately 2½ hours. Although 24 seconds per revolution of the globe is perfect to demonstrate, e.g., the effects of day and night, 2½ hours per full orbit of the globe might be to long to fit, say, into a lesson. For this reason, gear motor 112 is provided.

Motor 112 is a DC motor working on 3 V. When actuated (by pressing button C, see FIG. 13), pinion 110 drives gear 108. As the other pinion engaged with gear 108 is pinion 102, which is an integral part of worm wheel 58 (see FIG. 5), and as the latter cannot rotate since it meshes with worm 58 and is thus locked, pinion 102, without rotating, is simply dragged along by gear 108, thereby taking along also base plate 10 and arms 8, 8'. One full turn of arms 8, 8', when driven by motor 112, takes 10 seconds.

Figure 8:
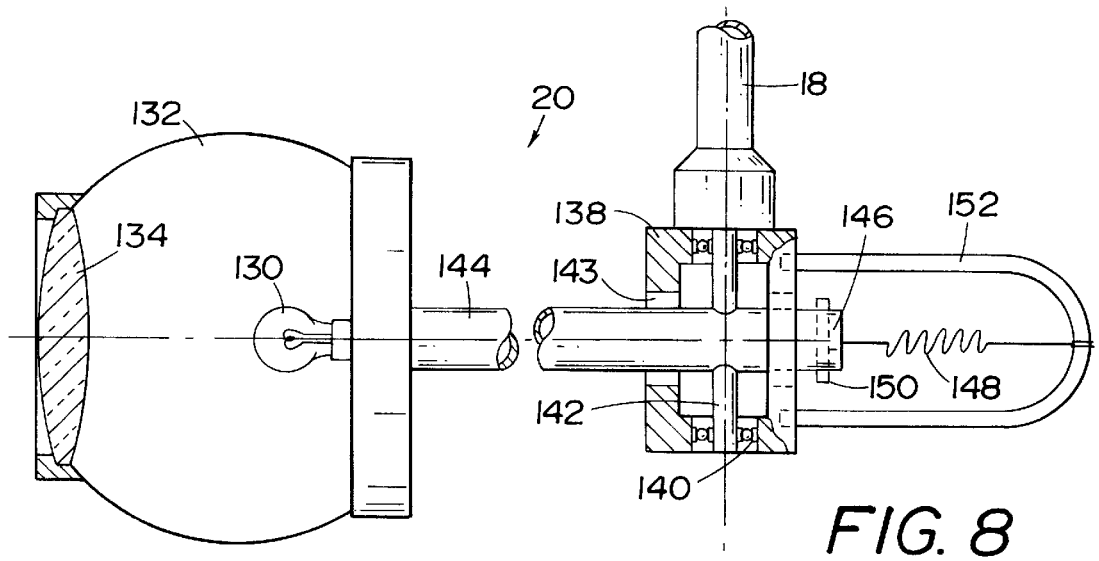
Figure 9:
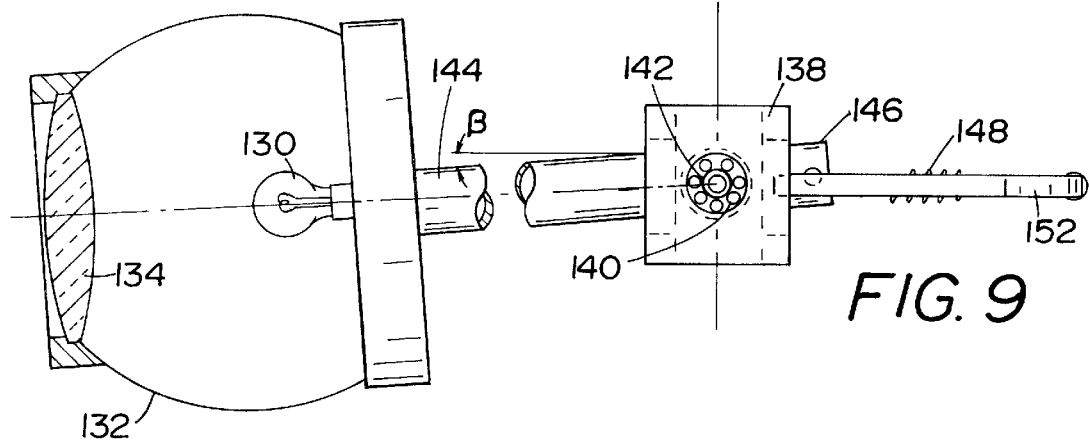

FIGS. 8 and 9 illustrate the light source unit 20 that represents the sun. The source proper consists of a 12 V bulb 130 mounted inside a substantially spherical housing 132 provided with a lens 134 of such power and distance from bulb 130 as will produce a conical tight beam of an angle large enough to fully cover globe 22 when the imaginary axis of the light cone passes through the center of globe 22. Of course, the use of a light source producing a conical light beam constitutes a simplification as, due to the large distance to the sun and the smallness of the earth relative to the sun, light rays produced by the sun and hitting the earth are considered to be parallel, but for the purpose of demonstration of the above-mentioned phenomena, this simplification is entirely acceptable.

Figure 10:
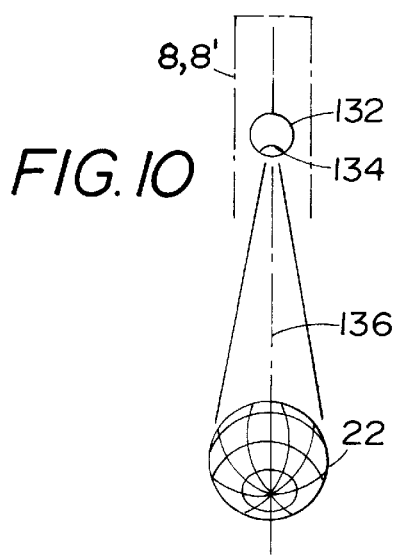
Figure 11:
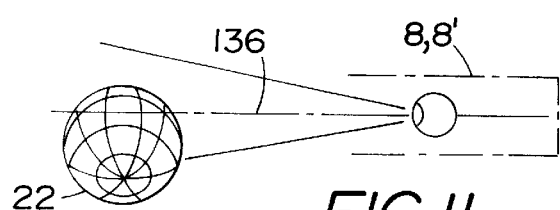

However, as seen in FIGS. 10–12, due to the above-discussed crooked shape of bearing housing 76, imaginary light cone 134 parallel to arms 8, 8' would, with a rigidly mounted light source unit 20, pass through the center of globe 22 only when arms 8, 8' are in a vertical position, i.e., at the equinoxes (FIG. 10). In all other positions, light cone axis 136 will deviate from the above on-center position, starting from an equinoctial position (FIG. 10) and increasing its deviation towards a maximum at a solstitial position (FIG. 11), to decrease again towards the next equinoctial position.

It is clear that in order to have globe 22 fully and substantially correctly illuminated at every point along its orbit around the "sun," this deviation must be compensated for. The manner in which this is done is explained in the following, in conjunction with FIGS. 8–12.

Apart from the already mentioned bulb 130, housing 132 and lens 134, there is seen in FIG. 8 the tubular supporting arm 18, one end of which is fixedly attached to arm 8'. Attached to the other end of arm 18 is a block 138 which accommodates two ball bearings 140 that support a relatively thin tubular shaft 142. The latter carries the tubular light source stem 144, the free end 146 of which is attached to the first end of a tension spring 148 by means of a pin 150. The second end of spring 148 is attached to a bow 152 anchored to block 138. The latter has two lateral openings 143 which permit stem 144 to tilt about the axis of shaft 142. The moment about shaft 142 produced by light source unit 20 (when not in the equinoctial position shown in FIG. 10) is counteracted to some degree, in fact, regulated, by spring 148.

Clearly, the more globe 22 progresses along its orbit beyond the equinoctial position of FIG. 10 (or FIGS. 1 and 2), the larger the tilting moment, and the larger the angle of tilt β relative to the center line of arms 8, 8', with a maximum tilt occurring at the solstitial position shown in FIG. 12. In other words, tilt β is a function of equilibrium between the position-depending moment produced by the weight of unit 20 on the one hand, and the restoring force of spring 148 on the other, with the chosen parameters of spring 148 being such that, at any position of arms 8, 8', tilt β ensuing from the above equilibrium is just about right to fulfill the above-mentioned on-center condition, i.e., to cause the imaginary light cone axis 134 to pass through the center of globe 22.

Obviously, arm 18, shaft 14 and stem 144 are hollow and intercommunicating, to permit the electrical leads to reach bulb 130.

FIG. 13 illustrates the electrical layout of the apparatus according to the invention. Seen is housing 30 accommodating fast-motion motor 112, a rechargeable 3 V battery 154, a battery charger 156, push-button A for light bulb 130, push-button B for main motor 16, and push-button C for fast-motion motor 112. One of slip rings 128 is grounded to protect the stationary part, as well as the moving part, of the apparatus.

While motor 16 powers both the rotation of globe 22 about its own axis and the rotation of globe 22 about the light source representing the sun, it would, of course, be possible to provide separate motors for each of these rotary movements.

It should also be mentioned that the orbital movement of globe 22 can also be effected by manually rotating arms 8, 8' and overcoming the resistance of fast-motion motor 112 to being driven via its output pinion 110.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. An apparatus for demonstrating various phenomena associated with the earth's movement about the sun, comprising:

an upright fixedly attached to a base;

at least one arm having two ends and being mounted on said upright in such a way as to be rotatable in a vertical plane;

a crooked bearing housing assembly located near one of said ends, said crooked bearing housing assembly supporting a spindle carrying a rotatable globe in such a way that, with respect to a line normal to the plane defined by said at least one arm, an axis of rotation is imparted to said globe downwardly at an inclination of about 23.5°;

a light source unit attached to said at least one arm at a point near the other of said ends thereof and producing a light beam of a spatial extent sufficient to substantially cover a hemisphere of said globe;

drive means for causing said globe to rotate about its own axis, and for causing said at least one arm to rotate in said vertical plane, and wherein said crooked bearing housing assembly imparting said inclination to the axis of rotation of said globe, is itself rotatably mounted in a low-friction bearing seated in a housing fixedly attached to said at least one arm, whereby gravitational force will cause said crooked bearing housing and thus said axis of rotation of said globe to be always located in a vertical plane, pointing downwards, irrespective of the instantaneous rotational position of said at least one arm and the orbital position of said globe.

2. The apparatus as claimed in claim 1, wherein said drive means for causing said globe to rotate about its own axis, and for causing said at least one arm to rotate in said vertical plane, is an electric gear motor located on said at least one arm near the other of said ends thereof.

3. The apparatus as claimed in claim 1, flirter comprising a second electric gear motor for increasing the speed of rotation of said at least one arm.

4. The apparatus as claimed in claim 1, wherein said light source unit comprises an electric light bulb enclosed in a housing having an opening provided with a lens producing a conical beam, said housing being attached to a stem tiltably articulated to a block fixedly attached to said at least one arm, further comprising a tension spring having two ends, one end of which is attached to a free end of said stem, the other end being stationary relative to said block, whereby said tension spring regulates a gravity-induced downward tilt of said stem.

5. The apparatus as claimed in claim 1, further comprising a display disc concentric with the axis of rotation of said at least one arm and rotating together therewith, said display disc carrying at least a peripheral scale comprising 365 divisions, each division representing one day, further comprising pointer means relating to said peripheral scale and being stationary while said display disc is rotating.

6. The apparatus of claim 1 wherein said light source unit comprises means for having an imaginary axis of the light beam substantially pass through the center of said globe, irrespective of an instantaneous orbital position thereof.

7. An apparatus for demonstrating various phenomena associated with the earth's movement about the sun, comprising:

an upright attached to a base;

at least one arm having two ends and being mounted on said upright in such a way as to be rotatable in a vertical plane;

globe support means adjacent one of said ends of said at least one arm for rotatably supporting a globe in such a manner that, with respect to a line normal to a plane defined by said at least one arm, an axis of rotation is imparted to said globe downwardly at an inclination of about 23.5°;

a light source unit attached to said at least one arm at a point spaced from said one of said ends and producing a light beam of a spatial extent sufficient to substantially cover a hemisphere of said globe;

drive means for causing said globe to rotate, and for causing said at least one arm to rotate in said vertical plane; and means for mounting said globe support means relative to said one end of said at least one arm such that gravitational force will cause said globe support means and thus said axis of rotation of said globe to be always located in a vertical plane, pointing downwards, irrespective of the instantaneous rotational position of said at least one arm and the orbital position of said globe.

8. The apparatus of claim 7 wherein said light source unit comprises means for having an imaginary axis of the light beam substantially pass through the center of said globe, irrespective of an instantaneous orbital position thereof.

* * * * *